United States Patent [19]

Oerding

[11] Patent Number: 4,705,325
[45] Date of Patent: Nov. 10, 1987

[54] ENDLESS TRACK HAVING SYNTHETIC PLATES WITH CHAIN LINK CONNECTIONS

[75] Inventor: Horst Oerding, Beverstedt, Fed. Rep. of Germany

[73] Assignee: Felasto Pur GmbH & Co. KG, Fed. Rep. of Germany

[21] Appl. No.: 933,887

[22] Filed: Nov. 24, 1986

Related U.S. Application Data

[63] Continuation-in-part of Ser. No. 707,100, Mar. 1, 1985, abandoned.

[30] Foreign Application Priority Data

Nov. 5, 1984 [DE] Fed. Rep. of Germany ... 8432310[U]

[51] Int. Cl.⁴ .................... B62D 55/20; B62D 55/26
[52] U.S. Cl. ..................... 305/35 R; 305/38; 152/228
[58] Field of Search ............ 305/35 R, 37, 38, 19, 305/40; 152/221, 222, 225 R, 226, 227, 228, 229

[56] References Cited

U.S. PATENT DOCUMENTS 1,943,918  1/1934  King ................................ 152/221
2,404,488  7/1946  Hait ............................ 305/35 R X
2,525,122  10/1950  Fletcher ......................... 152/228
3,355,224  11/1967  Skanes et al. ..................... 305/53
4,506,933  3/1985  Wadell ........................... 152/225 R

FOREIGN PATENT DOCUMENTS 448323   6/1936  United Kingdom ............... 152/222
1066177  4/1967  United Kingdom ............... 152/228

Primary Examiner—David A. Scherbel
Attorney, Agent, or Firm—Hill, Van Santen, Steadman & Simpson

[57] ABSTRACT

An endless track is provided in which the individual bottom plates are joined into a continuous track by tie bolts in the form of elongated chain links which are molded into the tracks with their arched ends projecting from the ends of the bottom plates, and rings formed of individual arches which capture adjacent arched ends of the links to form a continuous loop of bottom plates. The bottom plates are provided with a central profile ridge formed integrally with the plate to be engaged by rubber-tired wheels of a vehicle using the track to increase the traction between the tires and the plates.

12 Claims, 2 Drawing Figures

ENDLESS TRACK HAVING SYNTHETIC PLATES WITH CHAIN LINK CONNECTIONS

BACKGROUND OF THE INVENTION

This is a continuation-in-part application of U.S. Ser. No. 707,100, filed Mar. 1, 1985, now abandoned.

FIELD OF THE INVENTION

The invention relates to an endless track for construction or similar vehicles, and more particularly to an enless track comprising a plurality of bottom plates manufactured in a casting or injection molding process of elastic synthetic material such as polyurethane or the like.

DESCRIPTION OF THE PRIOR ART

In known continuous endless tracks for construction vehicles having rubber-tired individual wheels, the individual bottom plates have bores parallel to the continuous length of the endless track and adjacent to the lateral edges of the endless track which are penetrated by a tie bolt that is loosely insertable therethrough. The tie bolt thereby comprises a forkhead at its one end and a flattening penetrated by a cross-bore at its other end, this flattening being insertable into the fork head of the following bolt, whereupon, when the endless track is assembled from the individual bottom plates, a cross-bolt penetrating the aforementioned cross-bore and the fork head is introduced therethrough and tightened. A disadvantage that these known endless tracks, which are employed to give vehicles comprising rubber-tired individual wheels cross-country mobility as needed, have is that the overall tie forces which, of course, rise with an increasing motor output of the construction vehicle, must be absorbed by the described cross-bolt or, respectively, the corresponding connecting parts of the tie bolts, whereby fatigue fractures can easily occur under difficult operating conditions.

In known endless tracks, the adhesion of the individual bottom plates to the rubber-tired individual wheels also leaves something to be desired. This is not, however, of particular significance in the employment of known endless tracks since, as a consequence of the described design of the tie bolts and coupling elements, forces that are all too high dare not be exerted on the endless tracks by the individual wheels anyway. Thus, high drive outputs are not even contemplated.

SUMMARY OF THE INVENTION

An object of the invention is to create an endless track for use with a rubber-tired, individually wheeled vehicle, such as a construction or similar type vehicle, which given economical manufacturability, is also substantially more rugged than endless tracks heretofore known with respect even to high drive outputs of the individual wheels of the vehicle. This object is achieved in accord with the invention in that the tie bolts are formed as elongated, closed chain links integrally cast into the material of the bottom plate and which have their arched ends projecting beyond the end faces of the bottom plates at right angles relative to the length of the endless track. The coupling elements for adjacent bottom plates are closed catenarian arches or rings engaging into the end arches of two track chain links adjacent to one another in the length direction of the endless track. Further, the invention also provides that the catenarian arches can be welded at their respective joints to form a rigid ring permanently capturing two adjacent track chain links.

A further embodiment of the invention is characterized in that a profile ridge for engagement with the periphery or tread of the rubber-tired individual wheels of the construction vehicle is provided at the inside surface of every bottom plate. It can also be provided in accord with the invention that the profile ridge has a lesser width in the length direction of the endless track than it has perpendicular thereto. The invention is also further distinguished in that the profile ridge is disposed roughly centrally on the bottom plate. It can also be provided that the profile ridge is manufactured of one piece with the bottom plate.

A further embodiment of the invention provides that the track chain links are provided with an adhesion promoter with respect to the synthetic material of the bottom plates. Finally, it can also be provided in accord with the invention that the chain links integrally cast into the material of the bottom plate are fully surrounded by the synthetic material.

The surprising effect of the invention is that the integrally cast chain links which are non-positively connected to the material of the bottom plate over their entire cast-in length are substantially more rugged in interaction with the caternarian arches or rings provided as coupling elements than are the combination of the socket pins known from the prior art with corresponding cross pins which function as coupling elements therein. Over and above this, the inventively preferably provided profile ridge ensures a "clutching" of the bottom plates to the profile of the rubber-tired individual wheels. Thus, a faultless transmission of even considerable drive forces onto the upper surface of the endless track occurs which provides a high resistance to wear.

BRIEF DESCRIPTION OF THE DRAWINGS

Further features and advantages of the invention derive from the following description in which an exemplary embodiment is described in detail with reference to the schematic drawing.

DESCRIPTION OF THE PREFERRED EMBODIMENTS

Figure 1:
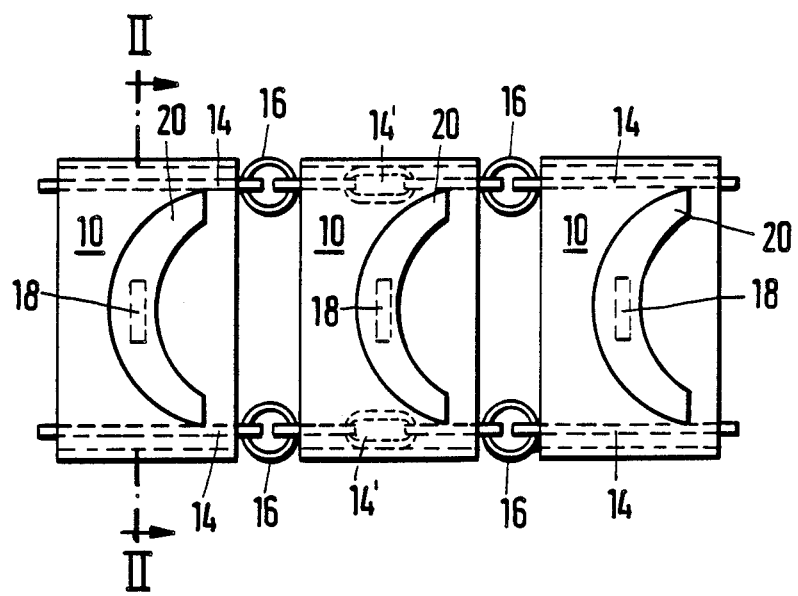
FIG. 1 is an exemplary embodiment of a section of a endless track of the invention shown in plan view.
Figure 2:
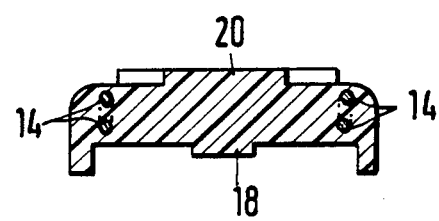
FIG. 2 is a sectional view along the line II—II in FIG. 1.

As the drawings show, the endless track section comprises a plurality of bottom plates 10 which are penetrated in the direction of the length of the endless track by two elongated, closed chain links 14 serving as tie bolts. The bottom plates 10 are preferably formed of a synthetic material, for example, polyurethane, such that they can be molded or cast in a desired form. The closed end arches of two chain links 14 protrude beyond the ends of the bottom plates 10 at right angles to the ends to form closed arches. The links 14 facing one another in the direction of the endless track are connected to one another by means of catenarian arches 16 which can, for example, be welded at their respective closing joints to form rigid rings after they are in an engaging position relative to the links 14. The chain links 14 and catenarian arches 16 are preferably fabricated of metal or a similarly highly durable and strong material. The chain links 14 are preferably treated with an adhesive ground coat such as, for example, thixon before they are integrally cast into the synthetic material of the bottom plates 10, in order to guarantee a faultless non-positive lock between the cast-in chain links 14 and the respective bottom plates 10.

A profile ridge 18 is provided on the inner surface of every bottom plate 10, this assuring the engagement of the bottom plate into the profiling or tread of the rubber-tired individual wheels of a construction vehicles. The ridge 18 is wider perpendicular to the length direction of the track than parallel thereto. The ridge is preferably centered on each bottom plate 10 and is cast integrally with the bottom plate. At its outer surface, each of the bottom plates comprises a traditional profiling 20 which improves the contact with the ground on which the tracked vehicle is to move.

It should also be pointed out that shackles or other chain connectors can, for example, also be employed instead of the welded chain links 14 within the framework of the inventive idea. Chain links 14' situated in the bottom plate and fully surrounded by synthetic material as illustrated in the central bottom plate 10 of FIG. 1, thereby also have the advantage of better positive lock between the chain links and the bottom plate, whereby the load or power transmission is significantly improved. That is, chains of at least three and preferably five connected chain links are cast in each one of the bottom plates such that at least the central link is completely encased in the synthetic material as well as its connection to the two other links. The outer two links have their closed arched ends projecting beyond the end faces of the bottom plate. The three or more links are integrally cast into the material of the bottom plates, each chain link oriented at right angles to the adjacent one to provide an improved positive lock between the chain links and the bottom plate.

Differing from the prior art, the individual bottom plates have limited mobility relative to one another, whereby a better application of the bottom plates against the rubber tires is achieved, likewise due to the novel chain links or, respectively chain connectors acting in a similar fashion. Thus, it is seen that there is provided an endless track to be used with individually rubber-tired vehicles which has an improved connection between individual bottom plates ensuring greater traction and permitting higher drive outputs than previously known tracks. The disclosed track is less subject to fatigue fractures than known tracks, thus improving the life and reliability of such tracks.

The features of the invention disclosed in the above description, in the drawing and in the claims can be essential both individually as well as in arbitrary combinations for the realization of the invention in its various embodiments. As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. A continuous endless track for vehicles having rubber-tired individual wheels comprising:
    a plurality of bottom plates fabricated of an elastic synthetic material;
    at least two tie bolts penetrating each individual bottom plate oriented along the continuous length of the endless track, and
    coupling elements connecting adjacent tie bolts to one another in the endless track length direction,
        said tie bolts being chains of at least three connected chain links having their closed arched ends projecting beyond the end faces of said bottom plates, which end faces extend at right angles relative to the length of the endless track and integrally cast into the material of said bottom plates, each chain link oriented at right angles to the adjacent one to provide an improved positive lock between the chain links and the bottom plate.

2. An endless track according to claim 1, wherein said coupling elements are closed catenarian arches engaging into said end arches of two chain links adjacent to one another along the length of the endless track.

3. An endless track according to claim 2, wherein said catenarian arches are welded into rings at their closing joints to permanently engage said chain links.

4. An endless track according to claim 1, wherein a profile ridge is provided on an inner surface of every bottom plate for engagement with the tread of the rubber-tired individual wheels of the vehicle.

5. An endless track according to claim 4, wherein said profile ridge has a lesser width along the length of the endless track than perpendicular thereto.

6. An endless track according to claim 5, wherein said profile ridge is disposed roughly centrally on each bottom plate.

7. An endless track according to claim 4, wherein said profile ridge is manufactured of one piece integrally with said bottom plate.

8. An endless track according to claim 1, wherein said chain links are provided with an adhesion promoter with respect to the synthetic material of said bottom plates.

9. An endless track according to claim 1, wherein said links cast into the material of said bottom plate are completely surrounded by the synthetic material except for said projecting arched ends.

10. A continuous endless track for vehicles having rubber-tired individual wheels comprising:
    a plurality of bottom plates fabricated of an elastic synthetic material;
        said bottom plates having a profile ridge formed on an inner surface thereof for engagement with said individual wheels;
    at least two tie bolts comprising chains of at least three connected chain links integrally cast into the material of said bottom plates and having their closed arched ends projecting beyond the end faces of said bottom plates, which faces extend at right angles relative to the length of the endless track;
        said chain links being provided with an adhesion promoter with respect to the synthetic material of said bottom plates; and
    coupling elements connecting tie bolts of adjacent bottom plates, said coupling elements comprising rings engaging said closed arches of adjacent chain links.

11. An endless track according to claim 10, wherein said profile ridge has a lesser width along the length of the endless track than perpendicular thereto.

12. An endless track according to claim 11, wherein said profile ridge is disposed roughly centrally on each bottom plate.

* * * * *